Dec. 31, 1940.    K. SCHLESINGER    2,227,009
KEYSTONE CORRECTOR
Filed Aug. 4, 1936

Inventor:

Patented Dec. 31, 1940

2,227,009

UNITED STATES PATENT OFFICE 2,227,009

KEYSTONE CORRECTOR

Kurt Schlesinger, Berlin, Germany, assignor, by mesne assignments, to Loewe Radio, Inc., a corporation of New York Application August 4, 1936, Serial No. 94,128
In Germany August 19, 1935

1 Claim. (Cl. 178—7.6)

In the case of certain present-day television transmitter constructions, for example the iconoscope, or also in the case of interlaced line transmitters, in which films are scanned by means of spiral aperture discs, the problem arises of optically distorting a rectangular area into a trapezoidal area. The angle formed by the two vertical edges of the trapezium, the so-called tumbling lines of the trapezium, requires at the same time to be regulated very exactly.

The novel features which I believe to be characteristic for my invention are set forth with particularity in the appended claim. My invention, however, both as to its organization and method of operation together with further objects and advantages thereof may be best understood by reference to the following description taken in connection with the accompanying drawing, in which Fig. 1 shows the principle of the idea of producing the distorted reproduction, while In Fig. 2 an examplary embodiment of the present invention is illustrated in schematic.

Figure 1:
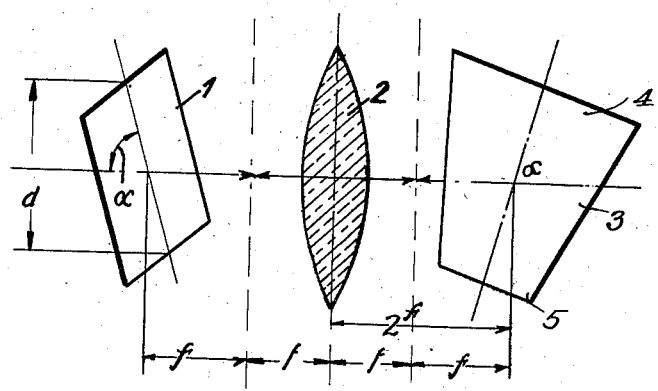

The basic optical arrangement, by means of which a rectangle is distorted into a trapezium, is shown in Fig. 1. The rectangular area 1 is converted into a trapezoidal area 3 because both planes form an angle of inclination $\alpha$ in relation to the plane of the lens 2. In consequence the distances between the upper and lower image edges of 1 and the lens 2 are different, and accordingly the scales of enlargement in respect of the reproductions of this edge are distorted to the desired extent. The relation between the upper edge 4 of the trapezium and the lower edge 5 of the trapezium, is represented by the formula $$v = \frac{1+\frac{d}{f}\cdot \sin\alpha}{1-\frac{d}{f}\cdot \sin\alpha}$$

in which a reproduction scale of 1:1 is supposed, $d$ is the length of film and image and $f$ the focal distance of the lens 2. Film and image planes 1 are arranged at a distance $2f$ from the lens.

Figure 2:
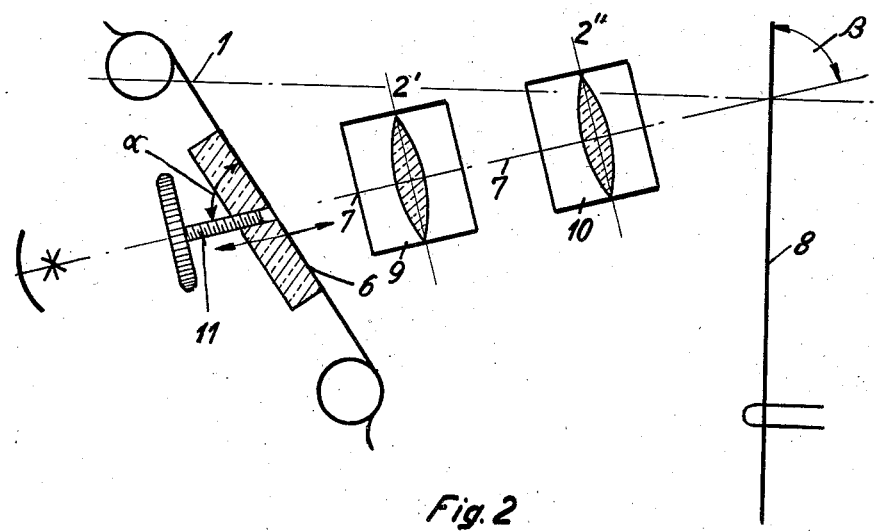

If, therefore, the distortion factor $v$ is to be varied, this may be done in accordance with the above formula, there being varied either the inclination $\alpha$ or the ratio of the distance of the plane of reproduction from the lens, i. e., the expression $d:f$. Variation of the angle of inclination $\alpha$ is very difficult to perform in the case of machine transmitters, as the entire machine body requires to be made to be adjustable in fine angles. A variation in the ratio $d:f$ also cannot be performed in the case of the single lens 2, as in this case the scale of reproduction would be varied. The enlargement, however, is definitely governed by other conditions, as it must be exactly adapted to the scanning area. A variation of $f$ alone would only be possible by interchanging different lenses. The jumps involved in this interchanging of the lenses are much too large, so that fine adjustment is not possible thereby. A way of escape from this difficulty is represented by the method according to the invention, which employs in place of a single lens 2 two lenses 2' and 2" each having about half the focal distance of lens 2, lens 2 being quasi divided in two parts. The optical system according to the invention is shown in Fig. 2. It is illustrated in respect of a film transmitter, but may naturally also be employed without variation in the case of an iconoscope. The plane of the film is represented by the film track 6, along which the film 1 is passed with steady movement. The film track forms with the central line 7 of the lens system, i. e., the optical axis of the system, the said angle $\alpha$; about the same angle $\beta$ is formed by the optical axis 7 and the scanning disc 8, on which there is projected a trapezoidally distorted reproduction of the rectangular film image area. The lenses 2' and 2", in accordance with the invention, are made to be shiftable, each one separately, along the optical axis 7 in two mountings 9 and 10, the planes of the objectives 2' and 2" always remaining perpendicular to the optical axis 7. An adjustment screw 11 enables the film track 6 to be moved a little backwards along the optical axes.

Now with this two-lens arrangement it is possible to accomplish the following: The distance between film and disc can be varied as desired by means of the screw 11. If the two lenses 9 and 10 are shifted in relation to each other along the axis, a sharp reproduction may be adjusted on the scale of 1:1 in respect of any distance between the film and the disc. If the distance between film and disc is large, the spacing between 9 and 10 is also large, and vice versa. The arrangement accordingly behaves always in the same manner as a lens with adjustable focal distance amounting to the fourth part of the adjusted distance between film and disc. By displacing the lenses 9 and 10 to each other the focal distance is varied practically without other effect. The fine adjustment of the sharpness of reproduction is made by means of screw 11. The factor $f$ in the above distortion formula has accordingly been variably adjusted within fine limits and consequently also the distortion $v$.

The applicant has been able only by means of this very fine adjustability of the distorting optical system to accomplish in practice the high precision which is required in the case of transmitters of this kind operating according to the interlaced line method. The following dimensions have been used in practice:

| | |
|---|---:|
| Maximum size of film image mm | 20 |
| Angle $\alpha$ approximately degrees | 12 |
| Focal distance 2' mm | 100 |
| Focal distance 2'' mm | 80 |
| Reproduction on disc approximately mm | 15 |
| Spacing between film and disc approximately mm | 300 |
| Spacing between 9 and 10 approximately mm | 300 |

Exactly the same problems as in the present case in connection with machine transmitters are encountered both in the case of iconoscope with inclined intercepting plate as well as in connection with projection television apparatus with Braun tube containing an inclined image plate silvered at the rear. In these arrangements it is desired either to reproduce rectangular images in trapezoidal form on the intercepting plate, in order to adapt the trapezoidal mosaic area of the iconoscope scanned by the cathode ray to the image area, or—in the case of projection television receivers—it is desired to convert a trapezoidally distorted luminous image resulting in the tube into an exactly rectangular image for observation purposes on the projection screen. In all of these cases the idea according to the invention provides the possibility of fine adjustment of the image angles and of sharpness.

I claim:

A keystone correction device for a television transmitter wherein a light image of a film strip is scanned to produce picture signals and wherein a trapezoidal pattern is inherently scanned at an image area by a scanning disc having a plurality of spirally arranged scanning elements situated near the periphery of the disc, the scanning elements being displaced by substantially equal angular amounts, comprising a film gate including a substantially rectangular object area, said film gate being displaced radially with respect to the scanning disc in the direction of the center of the disc from the image area and positioned at an angle with respect to the plane of the scanning disc, a source of light at the side of the film gate opposite the scanning disc, means for projecting a trapezoidal image of the object area onto the image area of the disc comprising a lens system positioned between the film gate and the disc, said lens system including a pair of objective lenses displaced along the optical axis, the distance between the two objective lenses being adapted to be varied, and means to adjust the position of the film gate with respect to the lens system, the spacing between the film gate and the lens system being adjusted to approximately equal the focal length of the lens system.

KURT SCHLESINGER.